United States Patent [19]

Hyatt

[11] Patent Number: 4,474,178

[45] Date of Patent: Oct. 2, 1984

[54] CATTLE DEHORNER

[75] Inventor: R. Loyd Hyatt, Forney, Tex.

[73] Assignee: Hy-Welding, Inc., Forney, Tex.

[21] Appl. No.: 403,812

[22] Filed: Jul. 30, 1982

[51] Int. Cl.³ .................... A61B 17/36; B26B 15/00
[52] U.S. Cl. .................................. 128/303.1; 30/228
[58] Field of Search ............... 128/303.1; 30/228, 241, 30/212, 180, 182, 388, 500

[56] References Cited

U.S. PATENT DOCUMENTS

| 1,120,473 | 12/1914 | Goodwin | 30/241 |
| 2,527,245 | 9/1941 | Rudolph | 30/228 |
| 2,764,813 | 10/1956 | Hoffman | 30/228 |
| 2,916,823 | 12/1959 | Mittanck | 30/241 |
| 3,056,267 | 10/1962 | McRee | 30/241 |
| 3,152,397 | 10/1964 | Adam | 30/228 |
| 3,177,584 | 4/1965 | Cockerill | 30/228 |
| 3,584,381 | 6/1971 | Jamison | 30/228 |
| 3,711,946 | 1/1973 | Troutman | 30/388 |
| 3,767,929 | 7/1972 | Nicholson | 30/228 |
| 3,808,683 | 5/1974 | Hetherington | 30/228 |
| 3,828,431 | 8/1974 | Fleming | 30/228 |
| 3,893,237 | 7/1975 | Jahnke | 30/228 |
| 3,995,369 | 12/1976 | Duff | 30/228 |
| 4,106,194 | 8/1978 | Steed | 30/228 |

Primary Examiner—Richard J. Apley
Assistant Examiner—Harry J. Macey
Attorney, Agent, or Firm—Michael A. O'Neil

[57] ABSTRACT

A cattle dehorner (10) comprises a power source (12), a power converter and control unit (14) and an operating unit (16). The power source (12) comprises an automotive-type storage battery. The power converter and control unit (14) comprises an electric motor (108) actuated by the power source (12), a pump (110) driven by the electric motor (108) and a hydraulic fluid reservoir (120). A valve (112) is provided for controlling the flow of hydraulic fluid to and from the pump (110) in the reservoir (120). The operating unit (16) includes a blade frame (22), a fixed blade (24) and a movable blade (34). A hydraulic cylinder (50) is secured to the blade frame (22) and functions to reciprocate the movable blade (34). The hydraulic cylinder encloses a spring (90) for retracting the movable blade (34) and a sleeve (92) for limiting the advance of the movable blade (34) under the action of pressurized hydraulic fluids supplied from the pump (110).

1 Claim, 3 Drawing Figures 4,474,178

CATTLE DEHORNER

TECHNICAL FIELD

This invention relates generally to cattle dehorning apparatus, and more particularly to a highly portable and self-contained cattle dehorner.

BACKGROUND AND SUMMARY OF THE INVENTION

Over the years, numerous attempts have been made at providing a commercially successful cattle dehorning apparatus. For example, U.S. Pat. No. 3,177,584 granted to Cockerill on Apr. 13, 1965, relates to an animal dehorner apparatus having a reciprocating blade. In the Cockerill apparatus, the blade is hydraulically driven in both directions. U.S. Pat. No. 3,995,369 granted to Duff on Dec. 7, 1976, pertains to a cattle dehorning apparatus also having a reciprocating blade. In Duff, the blade is hydraulically advanced and spring returned. U.S. Pat. No. 2,764,813 granted to Hoffman on Oct. 2, 1976 relates to a cattle dehorner which is actuated by blank cartridges. U.S. Pat. No. 3,767,929 granted to Nicholson on July 18, 1972, shows a dehorning apparatus which is driven by compressed gas.

Notwithstanding these and other attempts at providing a workable cattle dehorning apparatus, a need exists for further improvements in the art. Thus, due to the fact that dehorning operations are often carried out at extremely remote locations, a commercially acceptable cattle dehorner must be truly portable in nature. The dehorning apparatus also must be easily and accurately positionable relative to an animal horn to be removed, and must be constructed for reliable and safe operation. Finally, a commercially successful dehorning apparatus must be economical to purchase, while at the same time being adapted for long term, substantially maintenance free operation.

The present invention relates to a cattle dehorner which fulfills the foregoing requirements to provide significant improvements over the prior art. In accordance with the broader aspects of the invention, a fixed blade is mounted at one end of a blade frame which is in turn supported on a hydraulic cylinder. A moving blade is slidably supported in the blade frame for reciprocation toward and away from the fixed blade. The moving blade is connected to a piston mounted within the hydraulic cylinder and responsive to hydraulic pressure to advance the moving blade towards the fixed blade. Upon completion of its stroke, the moving blade is automatically retracted under the action of a spring also contained within the hydraulic cylinder. Pressurized hydraulic fluid for advancing the moving blade is supplied from a pump which is driven by an electric motor which is in turn actuated by either 12 volt or 24 volt D.C. electric power supplied from a conventional automotive-type storage battery.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
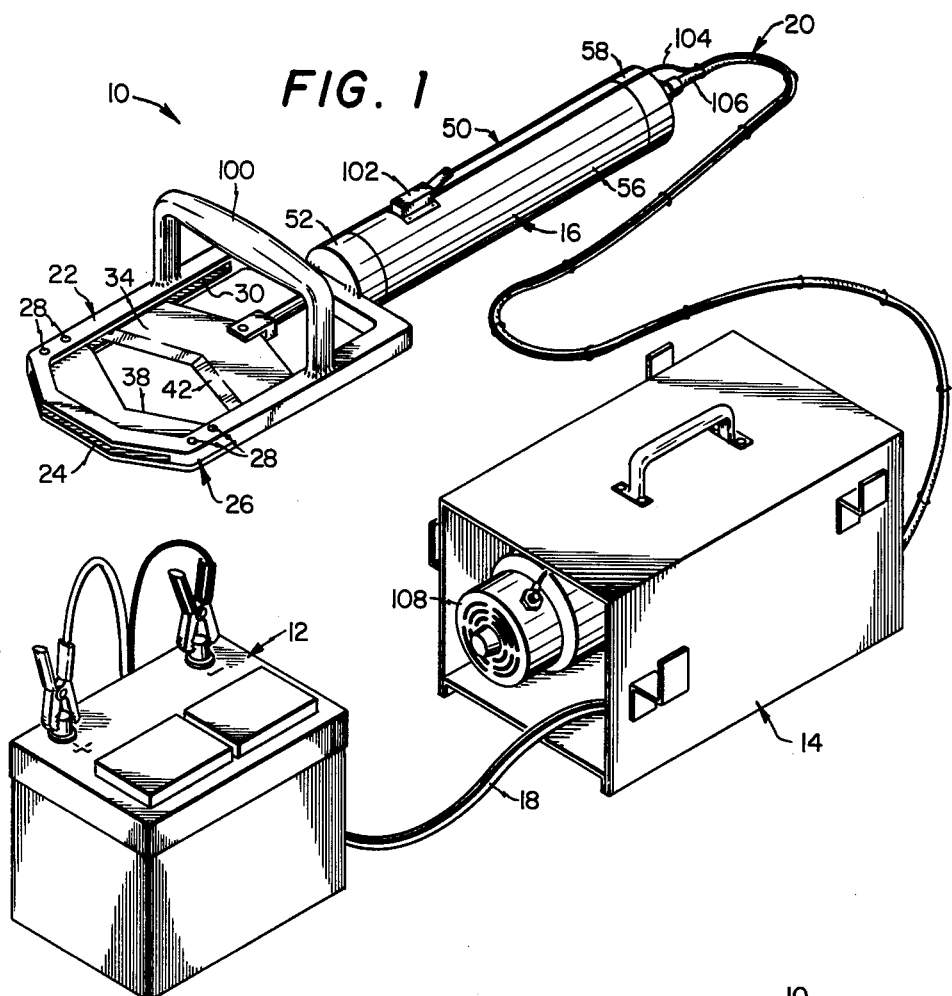
FIG. 1 is a perspective view of a cattle dehorner incorporating the present invention.

Referring now to the Drawings, and particularly to FIG. 1 thereof, there is shown a cattle dehorner 10 incorporating the present invention. The cattle dehorner 10 includes a power source 12, a power converter and control unit 14 and an operating unit 16. The power converter and control unit 14 is coupled to the power source 12 by means of a pair of electrical leads 18, and is in turn coupled to the operating unit 16 by a cable 20.

The power source 12 for the cattle dehorner 10 preferably comprises a conventional 12 volt automotive-type storage battery. The use of an automotive-type storage battery as the power source of the cattle dehorner 10 comprises an important feature of the invention because of the wide spread availability of such batteries. The automotive-type storage battery comprising the power source 12 may comprise a component part of a vehicle such as a pickup truck or an automobile, in which case the battery is automatically recharged by operation of the vehicle and the electrical system incorporated therein. Alternatively, the automotive-type storage battery comprising the power source 12 may be entirely independent of any vehicle or other apparatus, in which case the battery may be conveniently recharged during periods of nonuse by a conventional battery charger.

In certain applications of the invention the use of 24 volt D.C. power may be preferred. In such cases the power source 12 of the cattle dehorner 10 may comprise a 24 volt automotive-type storage battery. Alternatively, the power source 12 may comprise two 12 volt automotive-type storage batteries connected in series.

Figure 2:
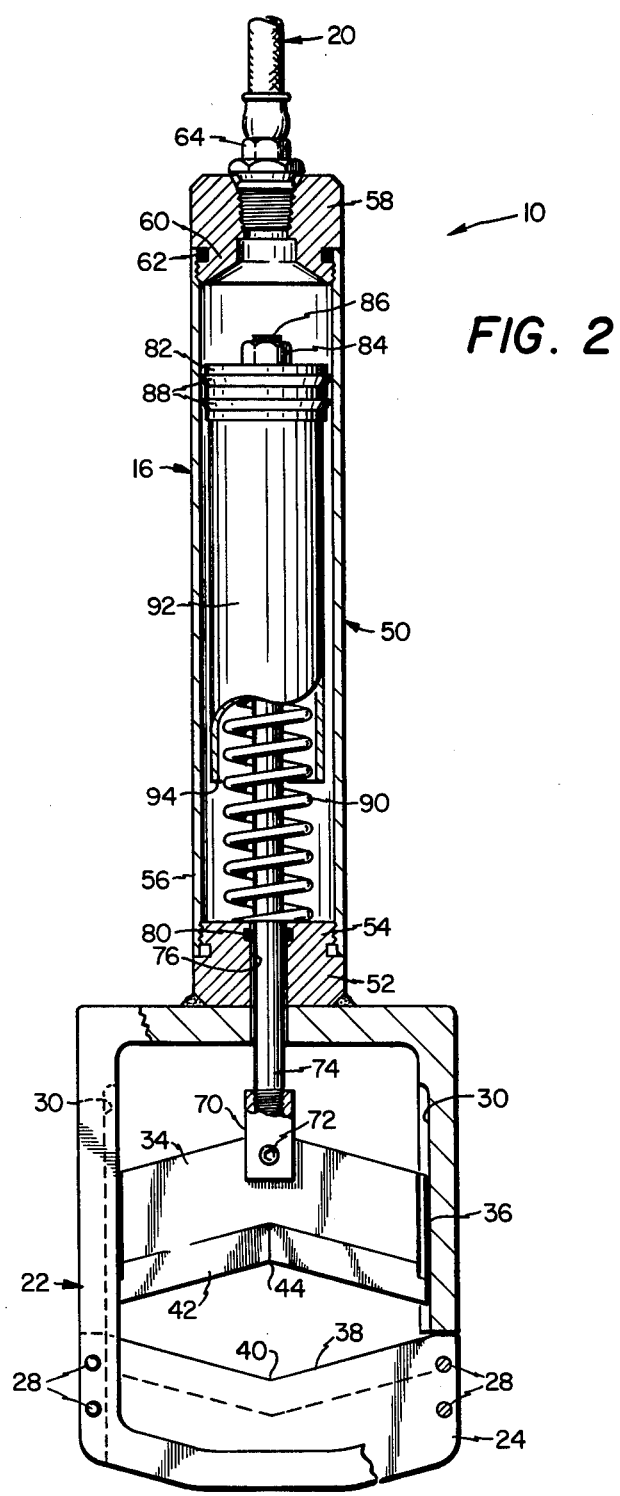
FIG. 2 is an illustration of the operating unit of the cattle dehorner of FIG. 1 in which certain parts have been broken away more clearly to illustrate certain features of the invention.

Referring to FIG. 2, the construction of the operating unit 16 of the cattle dehorner 10 is shown in detail. The operating unit 16 includes a blade frame 22 having a fixed blade 24 mounted in the distal end thereof. Referring momentarily to FIG. 1, the underside of the blade frame 22 is cut away at 26 and the fixed blade 24 is mounted in the cut away portion of the blade frame 22. The fixed blade 24 is secured in place by means of suitable fasteners 28, such as roll pins or the like.

Having reference again to FIG. 2, the blade frame 22 comprises opposed guideways 30. A movable blade 34 is mounted in the blade frame 22 for reciprocation with respect to the fixed blade 24. The movable blade 34 extends outwardly to remote ends 36 which are slidably received in the guideways 30 of the blade frame 22. The upper surface of the fixed blade 24 comprises an extension of the surfaces of the guideways 30 so that the movable blade 34 is fully supported and guided throughout its reciprocation.

The fixed blade 24 has a cutting edge 38 which tapers to a central point 40 and the movable blade 34 has a cutting edge 42 which tapers to a central point 44. As the movable blade 34 is reciprocated in the direction of the fixed blade 24, the cutting edge 42 thereof passes over the cutting edge 38 of the fixed blade so as to effect cutting of a cattle horn positioned therebetween. Advancement of the movable blade 34 continues until the central point 44 of the cutting edge 42 thereof has moved beyond the central point 40 of the cutting edge 38 of the fixed blade 24. This assures that a cattle horn positioned between the blades is fully and cleanly cut during operation of the cattle dehorner 10.

The blade frame 22 is welded to a hydraulic cylinder 50. The hydraulic cylinder 50 includes an end cap 52 which is welded to the blade frame 22 and extends to a threaded plug 54. The plug 54 is threadedly engaged with a tube 56 which extends from the end cap 52 to an end cap 58 situated at the opposite end of the hydraulic cylinder 50. The end cap 58 has a threaded plug 60 which is threadedly engaged with tube 56. An O-ring seal 62 is provided at the inner section of the end cap 58 and the tube 56. The cable 20 is secured to the end cap 58 by means of suitable fittings 64.

A yoke 70 is secured to the movable blade 34 by means of a suitable fastener 72 such as a roll pin or the like. A piston rod 74 is threadedly secured to the yoke 70 and extends therefrom through an aperture 76 formed through the end cap 52 and through the threaded plug 54. An O-ring seal 80 is provided between the threaded plug 54 and the piston rod 74.

A piston 82 is secured to the end of the piston rod 74 remote from the movable blade 34. The piston 82 is retained on the piston rod 74 by means of a nut 84 which is threadedly engaged with an extension 86 of the piston rod 74. The piston 82 carries a plurality of seals 88 whereby pressurized hydraulic fluid entering the end of the hydraulic cylinder 50 remote from the blade frame 22 is contained by the seals 88 and advances the piston 82, reciprocating the moveable blade 34 towards the fixed blade 24. The seals 88 of the piston 82 may comprise any of the various types conventionally employed in hydraulic cylinders.

A compression spring 90 surrounds the piston rod 74 in the region between the threaded plug 54 and the piston 82. The compression spring 90 is in turn surrounded by a sleeve 92 which is positioned between the piston 82 and the threaded plug 54. The length of the sleeve 92 controls the stroke of the movable blade 34 of the cattle dehorner 10. Thus, upon engagement of the end 94 of the sleeve 92 with the threaded plug 54 further movement of the movable blade 34 in the direction of the fixed blade 24 is prohibited. The use of the sleeve 92 comprises an important feature of the invention in that it limits the travel of the blade 34 under the action of pressurized hydraulic fluid entering the blind end of the hydraulic cylinder 50 while preventing damage to the spring 90 due to over compression.

Referring again to FIG. 1, a handle 100 is secured to the blade frame 22 of the operating unit 16. A switch 102 is mounted on the exterior of the tube 56 of the hydraulic cylinder 50. The switch 102 is a so-called dead man's switch in that it comprises a normally open switch which is closed only upon actual physical actuation by an operator. The switch 102 is positioned such that when an operator grasps the handle 100 in one hand and the hydraulic cylinder 50 in the other, the thumb of the operator will be positioned for convenient actuation of the switch 102.

The cable 20 extending from the power converter and control unit 14 of the cattle dehorner 10 to the operating unit 16 thereof comprises an electrical lead 104 and a hydraulic hose 106. The electrical lead 104 provides an electrical connection between the switch 102 and the power converter and control unit 14. The hydraulic hose 106 comprises a conduit for supplying pressurized hydraulic fluid to and for returning spent hydraulic fluid from the hydraulic cylinder 50 of the operating unit 16.

Figure 3:
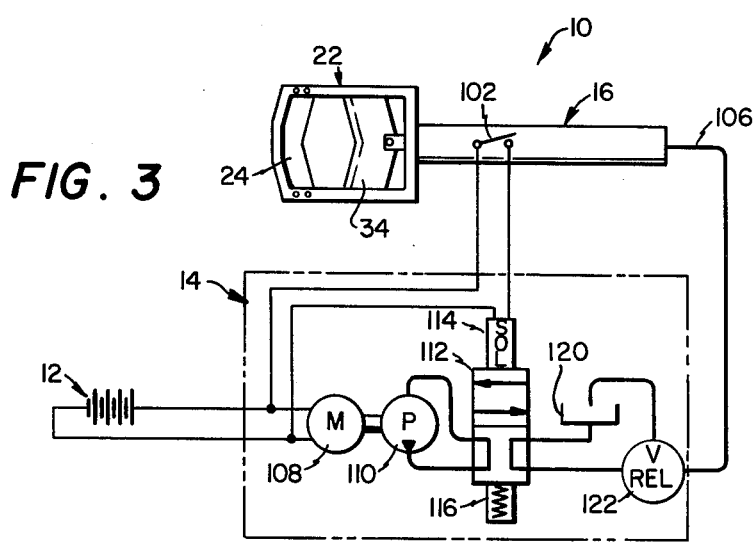
FIG. 3 is a schematic illustration of the power converter and control unit of the cattle dehorner of FIG. 1.

Referring now to FIG. 3, the power converter and control unit 14 of the cattle dehorner 10 includes a motor 108 which is directly connected to the power source 12. It will be understood that an off-on switch may be connected between the power source 12 and the motor 108, if desired. The motor 108 drives a hydraulic pump 110. A four way, two position valve 112 normally recycles the output of the pump 110 back to the input thereof.

Upon closure of the switch 102, a solenoid 114 shifts the position of the valve 112 against the action of a return spring 116. The valve 112 then connects the input of the pump 110 to a reservoir 120, and connects the output of the pump 110 to the hydraulic hose 106 extending to the blind end of the hydraulic cylinder 50. The presence of pressurized hydraulic fluid in the blind end of the hydraulic cylinder 50 actuates the piston 82 to advance the movable blade 34 towards the fixed blade 24, while simultaneously compressing the spring 90.

Assuming the switch 102 remains actuated, the piston 82 continues to advance until the end 94 of the sleeve 92 engages the threaded plug 54. The sleeve 92 is dimensioned to allow full and complete actuation of the movable blade 34 relative to the fixed blade 24 while preventing compression of the spring 90 to the point that it might be damaged. Upon engagement of the sleeve 92 with the threaded plug 54 a relief valve 122 is actuated to prevent excessive pressure buildup either in the hydraulic hose 106 or in the hydraulic cylinder 50.

Upon release of the switch 102 the spring 116 shifts the valve 112 back to the position illustrated in FIG. 3. At this point the blind end of the hydraulic cylinder 50 is connected through the hydraulic hose 106 to the reservoir 120. This allows the return of hydraulic fluid from the hydraulic cylinder 50 to the reservoir 120 under the action of the spring 90. At the same time the movable blade 34 is returned to the fully retracted position illustrated in FIG. 1.

In the operation of the cattle dehorner 10, a steer or similar animal is positioned in a suitable constraint. Preferably, the head of the animal is suitably restrained such that it is substantially immobile during operation of the cattle dehorner 10. An operator then manipulates the operating unit 16 to position a horn to be removed in the space surrounded by the blade frame 22, the fixed blade 24 and the movable blade 34. In so doing the operator grasps the operating unit 16 by placing one hand on the handle 100 and the other hand on the hydraulic cylinder 50.

With the horn to be removed properly positioned the thumb of the operator is utilized to actuate the switch 102. Upon closure of the switch 102 the solenoid 114 shifts the position of the valve 112 thereby directing pressurized hydraulic fluid from the pump 110 to the blind end of the cylinder 50 through the hose 106. As the movable blade 34 is advanced under the action of hydraulic pressure the horn of the animal is severed between the cutting edge 42 of the movable blade and the cutting edge 38 of the fixed blade.

Upon completion of the cutting operation the switch 102 is released. The spring 116 then returns the valve 112 to the position shown in FIG. 3. At this point hydraulic fluid from the blind end of the hydraulic cylinder 50 is returned to the reservoir 120 under the action of the spring 90, and the blade 34 is simultaneously returned to its retracted position.

From the foregoing it will be understood that the present invention comprises a cattle dehorner which is constructed from a relatively small number of uncomplicated parts and elements, and is therefore adapted for economical manufacture as well as long term, substantially maintenance free service. The cattle dehorner of the present invention is highly reliable and safe in operation, and is adapted for operation at remote locations which are substantially removed from conventional power sources.

Although particular embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A cattle dehorner comprising:

a blade frame including spaced apart, opposed movable blade guideways;

a first blade fixedly mounted at one end of the blade frame;

a second blade including end portions engaged in the movable blade guideways of the blade frame for reciprocation toward and away from the first blade to effect cutting of an animal horn positioned therebetween;

a hydraulic cylinder secured to the blade frame at the end thereof remote from the first blade and having first and second ends;

a piston rod secured to the second blade and extending therefrom through the first end of the hydraulic cylinder;

a piston mounted on the end of a piston rod remote from the second blade and responsive to fluid pressure within the second end of the hydraulic cylinder to reciprocate the second blade toward the first blade;

a cylindrical compression spring surrounding the piston rod, and positioned between the piston and the first end of the hydraulic cylinder for reciprocating the second blade away from the first blade;

a rigid sleeve surrounding the compression spring and the piston rod and positioned between the piston and the first end of the hydraulic cylinder for limiting movement of the piston rod and therefore the second blade in response to fluid pressure within the second end of the hydraulic cylinder, said sleeve mounted on said piston for movement therewith;

a four position, two way hydraulic valve;

a relief valve connected between said hydraulic valve and said second end of said hydraulic cylinder, responsive to movement of said sleeve against said first end of said hydraulic cylinder for relieving excessive pressure buildup in said hydraulic cylinder;

hydraulic hose means for connecting the second end of the hydraulic cylinder to the relief valve, and the relief valve to the hydraylic valve;

a hydraulic fluid reservoir connected to the hydraulic valve and the relief valve by said hydraulic hose means;

a hydraulic pump having an input and an output both connected to the hydraulic valve;

an electric motor for actuating the hydraulic pump;

valve positioning means including a solenoid for normally positioning the hydraulic valve to connect the second end of the hydraulic cylinder through the hydraulic hose means to the hydraulic reservoir so that the compression spring actuates the piston to force hydraulic fluid out of the second end of the hydraulic cylinder and into the hydraulic reservoir, said valve positioning means also including a return spring;

a dead man's switch mounted on the hydraulic cylinder for actuating the solenoid to position the hydraulic valve to connect the input of the hydraulic pump to the hydraulic fluid reservoir, and to connect the output of the hydraulic pump to the hydraulic hose means so that pressurized hydraulic fluid flows from the pump through the relief valve and into the second end of the hydraulic cylinder, thereby advancing the piston to reciprocate the second blade towards the first blade and simultaneously compressing the compression spring, said return spring serving to reposition the hydraulic valve upon release of said dead man's switch;

electric connector means extending along the hydraulic hose means for electrically connecting the dead man's switch to the solenoid;

an automotive-type storage battery for actuating the electric motor and the solenoid; and housing means enclosing the hydraulic and relief valves, the hydraulic reservoir, the valve positioning means, the pump and the motor, and connected to the hydraulic cylinder by the hydraulic hose means and the electric connector means.

* * * * *